June 23, 1970     C. K. MENKES ET AL     3,516,861
GLASS DOSIMETER WASHING TECHNIQUE AND APPARATUS
Filed March 10, 1967
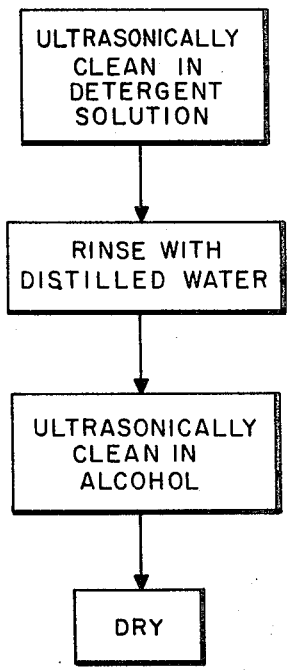
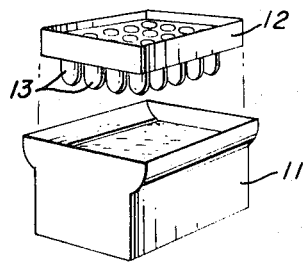
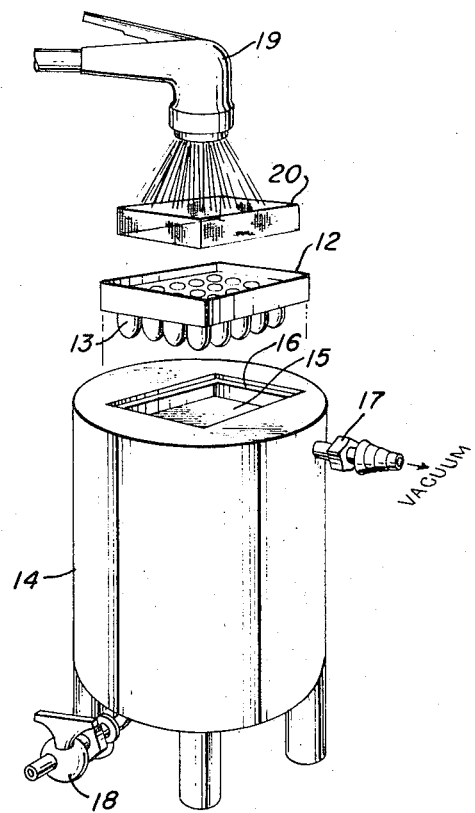
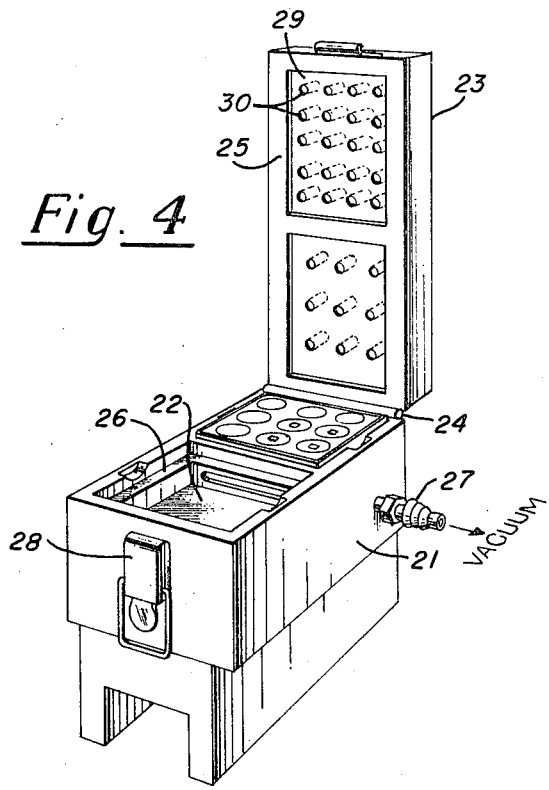
INVENTORS
CIREL K. MENKES
MAYNARD A. TESEM
BY
AGENT
ATTORNEYS

United States Patent Office

3,516,861
Patented June 23, 1970

3,516,861
GLASS DOSIMETER WASHING TECHNIQUE AND APPARATUS
Cirel K. Menkes, San Francisco, and Maynard A. Tasem, South San Francisco, Calif., assignors to the United States of America as represented by the Secretary of the Navy
Filed Mar. 10, 1967, Ser. No. 623,188
Int. Cl. B08b 7/04
U.S. Cl. 134—1                                    1 Claim

ABSTRACT OF THE DISCLOSURE

A method and apparatus for removing without the application of heat surface contaminants from small glass dosimeters. The method comprises the steps of ultrasonically cleaning the dosimeters in a detergent solution, rinsing the cleaned dosimeters with distilled water, ultrasonically cleaning in alcohol and drying the dosimeters by passing cool air over the dosimeters.

---

The invention described herein may be manufactured and used by or for the Government of the United States of America for governmental purposes without the payment of any royalties thereon or therefor.

BACKGROUND OF THE INVENTION

The use of small glass objects in many laboratory procedures necessitates that the objects be substantially free from any surface contaminants. In particular, the use of silver-activated phosphate glass rods and squares as radiation dosimeters requires that the surface of the rods and squares be substantially free of foreign matter if meaningful and reproducible radiation measurements are to be obtained from the dosimeters. Such glass dosimeters are read by stimulating them with ultraviolet light and then measuring the resultant fluorescence, the fluorescence being proportional to the dose of radiation to which the dosimeter was subjected. Almost all contaminants e.g., lint, dust, solvent residue, oils, etc., will either fluoresce under stimulation of ultraviolet light or partially absorb or scatter the light being measured. It is thus imperative that such contaminants be removed from the dosimeters if the latter are to be used with any degree of accuracy and reproducibility.

It was found by the inventors that the use of conventional laboratory washing and rinsing techniques was not sufficient to insure that the glass dosimeters were free of contaminants. Any cleaning techniques which utilized heat in any manner were undesirable since the application of heat to the glass dosimeters might result in a change in the dose indicated by the particular dosimeter.

SUMMARY OF THE INVENTION

An object of this invention, therefore, is to provide a method of removing surface contaminants from small glass articles.

A more particular object of this invention is to provide a method and apparatus for removing surface contaminants from glass dosimeters as used in radiation dose measurements.

The instant invention achieves the above noted objects by providing a unique combination of method steps and particular apparatus for cleaning the glass articles. In accordance with this invention, the articles are first immersed in a vessel containing a cold detergent solution and then subjected to ultrasonic agitation. They are then removed from the detergent solution and rinsed with pure distilled water. The articles are then immersed in cold alcohol and again subjected to ultrasonic agitation. Finally, they are removed from the alcohol and dried by placing them in a stream of cool clean air. A particular drying apparatus is used to perfom the last noted step of the process.

The above noted objects and features of the invention will be better understood from the following description in conjunction with the attached drawings wherein:

FIG. 1 is a flow chart of the method of this invention;
FIG. 2 is a pictorial view of the apparatus used in the cleaning steps of the method of FIG. 1;
FIG. 3 is a pictorial view of the apparatus used to perform the rinsing step of the method of FIG. 1;
FIG. 4 is a pictorial view of the drying apparatus used in accordance with his invention.

Referring now to the flow chart of FIG. 1, the steps of the method of this invention will be considered in detail. As already mentioned, the first step comprises placing the glass dosimeters which have been exposed to radiation doses in a detergent solution and then ultrasonically agitating the solution. For cleaning the glass dosimeters, it is important that the solution comprise cold water and a suitable detergent. The cold water is necessary, as mentioned above, to insure that the radiation dose measured by the dosimeter is not modified as it might be if subjected to heat. Since cold water is used, a detergent which is soluble in cold water must be utilized. Powder detergents are therefore undesirable in view of the latter requirement. It has been found that a detergent sold under the trade name Aquet by the Emil Greiner Co. provides satisfactory results. The detergent should be agitated for approximately five minutes to insure proper cleansing action.

The dosimeters, are then removed from the detergent solution and rinsed with pure distilled water. Once again the water should be relatively cool for the same reasons noted above and must be free from any impurities whch might be deposited on the surface of the glass dosimeters.

After the water rinse, and in particular the glass dosimeters, are once again placed in the tank of an ultrasonic agitator. This time, however, the tank contains alcohol. The alcohol is then subjected to the ultrasonic agitation. The function of the cleaning in alcohol step is to dilute the remaining water on the glass and to permit the glass surface to be quickly dried by evaporation of the alcohol.

The final step in the process comprises drying the glass dosimeters by drawing a stream of cool air over them. Obviously, the air must be deposited upon the glass. A particular dryer apparatus has been constructed for carrying out this last step. The dryer will be described in detail at a later point.

Referring now to FIG. 2 a typical tank 11 of an ultrasonic-agitation-type cleaner is shown. Various ultrasonic cleaners are available commercially and most are suitable for use with the method of the instant invention. A stainless steel tray 12 is shown positioned over the tank 11. The tray 12 is provided with a plurality of receptacles, such as 13, for holding the glass dosimeters to be cleaned. Each receptacle 13 is generally cup-shaped and is secured in a mating hole in the tray 12. The tops of the cup-shaped receptacles are open and consequently the articles may be placed into the receptacles directly through the top of the tray. The bottom of each of the receptacles is provided with a plurality of holes of very small diameter. The particular diameters of the holes are chosen to be less than that of the glass dosimeter to be placed in the receptacles for cleaning to prevent any articles from being lost through the said holes. The holes provide access for various cleaning and rinsing solutions to the interior of the receptacles. Once the articles to be cleaned are placed in the receptacles, they remain there throughout the various steps of the process since tray 12 may be moved from one to another of the various apparatus utilized in the process. The tray 12 should therefore be designed to fit within the tank 11 in a manner such that the receptacles are submerged in the solution contained within the tank.

The ultrasonic tank 11 is, of course, used for the initial cleaning operation with a detergent solution and later during the alcohol rinse.

For the distilled water rinsing step, the apparatus shown in FIG. 3 has been successfully utilized. The rinsing apparatus of FIG. 3 comprises a sealed container 14 provided with an opening 15 in its top for receiving the article holding tray 12. The opening 15 is provided with a suitable sealing ring 16 for insuring that an airtight seal is maintained between the tray 12 and the container 14. A vacuum supply is attached through fitting 17 to the container 14 at a point in the upper region of the latter to minimize rinse water from entering the vacuum line. The base of the container 14 is provided with a drain cock 18 to permit liquid which collects inside the container to be periodically removed. The rinsing liquid, which should be distilled water as mentioned above, is supplied from a suitable nozzle such as 19. A screen 20 may be fitted to the top of the tray 12 to insure that the small glass articles are not removed from the receptacles 13 by force of the rinsing water.

In operation, tray 12 is inserted in opening 15 and screen 20 placed over its top. Drain cock 18 is then closed and the vacuum supply is turned on. When water from nozzle 19 is applied, the vacuum causes the water to be drawn through the holes in the bases of the receptacles and into the container 14. The use of the vacuum permits the rinse water to be drawn over the glass articles in the receptacles in an efficient manner and insures that any residue is removed to the interior of the container 14.

In FIG. 4 the drying apparatus used in conjunction with the method of this invention without the application of any heat whatsoever is shown. It uses a vacuum principle similar to that used in the rinsing apparatus of FIG. 3. The dryer generally comprises a housing 21 provided with at least one opening such as 22 in its top surface for receiving an article holding tray 12, and a cover 23. The cover 23 is attached to the housing 21 by hinge 24 and is provided with a rubber sealing gasket 25 on its underside. Opening 22 is provided with a sealing ring 26 for insuring that tray 12, when inserted, is maintained in airtight relationship with the interior of housing 21 around its edges.

Cover 23 contains at least one glass plate 29 having a plurality of small holes such as 30 bored therethrough. The holes are located in such a manner that when the cover 23 is closed onto the housing 21, each hole is aligned over a particular one of the receptacles in tray 12. Glass is utilized in the cover 23 to permit the drying operation to be readily observed when the cover is secured. The apparatus shown in FIG. 4 is adapted to dry two article holding trays simultaneously but it should be understood that it could be designed to contain any number of trays. In FIG. 4, a nine receptacle tray is shown seated in one of the openings of the housings. Consequently, nine holes are provided in the adjacent cover plate. A vacuum supply is connected to the interior housing 21 through fitting 27. Latch 28 permits the cover 23 to be secured to the housing 21 during the drying operation.

In operation then, the trays containing the glass dosimeters to be dried are placed in the openings in the housing and the cover is closed. The vacuum supply is then turned on. Air is therefore drawn through the holes in the cover, over the articles in the receptacles, through the small holes in the bottoms of the receptacles and out through fitting 27 to the vacuum supply. Such an arrangement is effective to dry the small glass articles without the application of any heat in a manner of seconds. If necessary, suitable clean air ducting may be provided for positioning over the holes in the cover plate.

Although particular apparatus has been shown and described for carrying out the method of this invention, it should be understood that other forms of apparatus could be substituted with satisfactory results.

It might be noted that when the method and apparatus is used to clean glass dosimeters, the process is performed after the dosimeters have been used to record radiation doses and prior to their being read in suitable dose reading equipment.

By utilizing the method and apparatus of this invention results were obtained which were vastly superior to those possible with any known prior cleaning techniques.

Although the invention has been described with respect to a particular embodiment thereof it should be understood that it is not limited thereto but various changes and modifications could be made by one having ordinary skill in the art without departing from the spirit and scope of the invention as defined in the following claim.

What is claimed is:
1. A method for improving the accuracy of radiation measurements obtained from glass dosimeters used in radiation dose measurements by removing surface contaminants comprising the steps of,
   placing said dosimeters in a stainless steel tray having a plurality of cup-shaped perforated receptacles,
   immersing said tray in a tank containing a solution of liquid detergent and cold water,
   subjecting said solution to ultrasonic agitation for approximately five minutes to thereby remove from said dosimeters substantially all surface contaminants which fluoresce under the stimulation of ultraviolet light,
   removing said tray from said tank,
   placing said tray in a sealed, vacuum operated rinsing container having an opening for receiving said tray,
   rinsing said dosimeters by spraying said tray within said container with cold distilled water free from impurities,
   removing said tray from said container,
   immersing said tray in a tank containing cool alcohol,
   subjecting said alcohol to ultrasonic agitation,
   removing said tray from said tank, placing said tray in a vacuum operated drying apparatus, and
   drying said dosimeters in said tray without the application of heat by drawing a stream of cool air over said dosimeters by means of said drying apparatus.

References Cited

UNITED STATES PATENTS

| 3,182,668 | 5/1965 | Hartsell | 134—1 XR |
| 3,291,640 | 12/1966 | Livingston | 134—1 |

OTHER REFERENCES

Fisher catalog "63," 1962, p. 738.

MORRIS O. WOLK, Primary Examiner

D. G. MILLMAN, Assistant Examiner

U.S. Cl. X.R.

134—25, 26